(No Model.)
W. DORAN.
DEVICE FOR RAISING OR LOWERING ELECTRIC LAMPS.
No. 488,878. Patented Dec. 27, 1892.
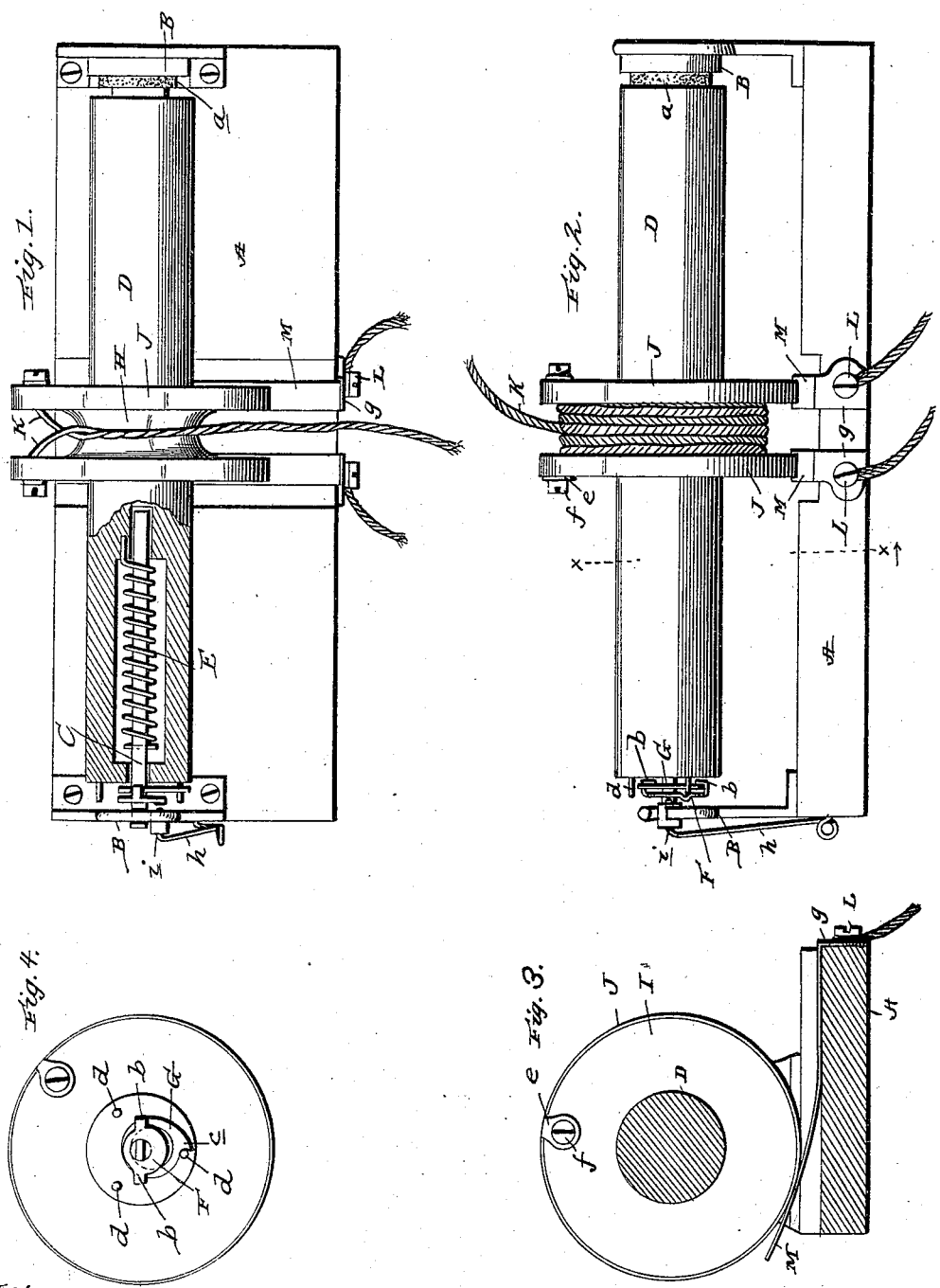
Witnesses:
C. H. Raeder
N. F. Matthews
Inventor
William Doran
By James J. Sheehy
Attorney

UNITED STATES PATENT OFFICE.

WILLIAM DORAN, OF SKOWHEGAN, MAINE.

DEVICE FOR RAISING OR LOWERING ELECTRIC LAMPS.

SPECIFICATION forming part of Letters Patent No. 488,878, dated December 27, 1892.

Application filed December 4, 1890. Serial No. 373,623. (No model.)

*To all whom it may concern:*

Be it known that I, WILLIAM DORAN, a citizen of the United States, residing at Skowhegan, in the county of Somerset and State of Maine, have invented certain new and useful Improvements in Devices for Raising or Lowering Lamps; and I do declare the following to be a full, clear, and exact description of the invention, such as will enable others skilled in the art to which it appertains to make and use the same.

My invention relates to improvements in devices for hanging incandescent electric lamps, whereby the same may be readily raised or lowered; and the novelty will be fully understood from the following description and claim when taken in connection with the accompanying drawings in which:

Figure 1, is an inverted plan view of my improved device, with a portion of the pulley shaft in section to illustrate the winding spring thereof. Fig. 2, is a longitudinal elevation of the same in an inverted position. Fig. 3, is a transverse section taken in the plane indicated by the line $x$, $x$, on Fig. 2, and: Fig. 4, is an elevation of one end of the pulley shaft removed from its bearing.

In the said drawings, similar letters indicate corresponding parts throughout the several views, referring to which:

A, indicates the attaching plate of my improved device from which depend the hangers B, one of which is provided with a circular eye, having an inwardly directed flange on its outer side to receive an annulus $a$, of felt or similar material which affords a bearing for the reduced end of the pulley shaft presently to be described. The other hanger B, is provided with a curvilinear open portion and a rectangular seat leading from said open portion and adapted to receive the squared end of a fixed shaft C, which takes through the center of the pulley shaft D, and affords a bearing for one end thereof.

Suitably connected to the end of the attaching plate or strip A, is one end of a spring wire arm $h$, which is coiled adjacent to its attachment and is provided at its opposite end with a lateral stud $i$, which takes into the curvilinear open portion of the hanger and serves to retain the squared end of the shaft C, in its rectangular seat.

As better illustrated in Fig. 1, of the drawings, the shaft D, is interiorly recessed for a portion of its length around the fixed shaft C, to afford space for a coiled spring E, which surrounds the fixed shaft and has one end connected to the pulley shaft, whereby said latter shaft is rotated when the spring has been retracted and released as will be presently described.

Fixed upon the shaft C, adjacent to the end thereof is a disk F, which is provided at opposite points upon its periphery with ears $b$, which are bent inwardly as better illustrated in Fig. 2, of the drawings, and engage the periphery of a gravitating cam G, which is loosely mounted upon the shaft C, and is provided with a shoulder $c$, which serves to engage lateral lugs $d$, extending from the end of the pulley shaft, for a purpose presently to be described.

Fixed upon or formed integral with the shaft D, is a pulley H, which is provided with flanges I, upon the peripheries of which metallic tires or bands J, are placed. These tires J, are provided with ears $e$, having eyes to receive attaching screws $f$, which take through the flanges I, and serve to attach the tires thereto and also to connect the electric wires K, leading to the lamp with the tires.

L, indicates binding posts which take through plates $g$, fixed upon the edge of the plate A, and serve to connect the electric line wires to the said plates as illustrated.

Connected to or formed integral with the plates $g$, are flexible metallic shoes M, which occupy a position in the same vertical plane as the flanges I, whereby they are adapted to engage the tires or bands thereon to complete the electrical circuit between the line wires and the wires K, leading from the pulley to the lamp.

It will be seen from the foregoing description, that the flexible shoes M, not only afford a cheap and simple connection between the line wires and the metallic peripheries of the flanges I, but they exert a constant pressure upon said peripheries, by reason of which the electrical connection will not be effected by frictional wear of the peripheries and shoes.

In practice before the shafts C, and D, are mounted in the hangers, the shaft C, is turned so as to retract or set the spring E, as is necessary.

By the construction described, the lamp upon the ends of the wires K, may be fixed at any suitable altitude and may be readily adjusted up and down without in any manner affecting the electrical circuit. When it is desired to raise the lamp, the wires K, are pulled down a slight distance and are suddenly slackened when the lugs $d$, upon the shaft D, will ride over the shoulder of the cam F. The wires are slackened until the lamp reaches the desired altitude, when by holding the same for an instant, the cam F, will drop so that its shoulder will engage the lugs $d$, and stop the rotation of the pulley shaft.

Having described my invention what I claim and desire to secure by Letters Patent is:

In a hanger for incandescent electric lamps, the combination of an attaching plate, a shaft journaled at one end in a hanger and bearing at its opposite end upon a fixed shaft, the lateral studs extending from one end of the pulley shaft, the said fixed shaft keyed in a hanger, the arm carrying a stud adapted to retain the fixed shaft in its seat, the disk fixed upon the fixed shaft and having lugs adapted to engage a gravitating cam, the said gravitating cam having a shoulder adapted to engage the lateral lugs of the pulley shaft, the parallel flexible metallic shoes connected to the attaching plate and with wires leading from a dynamo, the pulley on the pulley shaft provided with flanges having metallic peripheries adapted to engage the flexible metallic shoes, and wires connecting the peripheries of the pulley flanges with a lamp, all adapted to operate, substantially as specified.

In testimony whereof I affix my signature in presence of two witnesses.

WM. DORAN.

Witnesses:
CHAS. F. JONES,
H. W. VARNEY.